United States Patent [19]

Iijima et al.

[11] 3,912,585

[45] Oct. 14, 1975

[54] PROCESS FOR AEROBIC CULTIVATION OF MICROORGANISM

[75] Inventors: Tokuji Iijima; Yooji Odawara; Tetsuo Yamaguchi, all of Hitachi, Japan

[73] Assignee: Hitachi, Ltd., Japan

[22] Filed: Dec. 29, 1972

[21] Appl. No.: 319,609

[30] Foreign Application Priority Data

Dec. 29, 1971 Japan.................................. 47-1604

[52] U.S. Cl................. 195/28 R; 195/109; 195/115
[51] Int. Cl.².............................................. C12B 1/00
[58] Field of Search.......... 195/109, 28 R, 140–142, 195/115, 104, 82, 96

[56] References Cited
UNITED STATES PATENTS 2,118,370  5/1938  Wessblad et al................ 195/109 X
3,268,419  8/1966  Champagnat et al............ 195/28 R Primary Examiner—A. Louis Monacell
Assistant Examiner—R. B. Penland
Attorney, Agent, or Firm—Craig & Antonelli

[57] ABSTRACT

A process for aerobic cultivation of a microorganism which assimilates n-paraffins comprises introducing an oxygen-containing-gas into an aqueous medium containing the microorganism dispersed therein and the n-paraffins with agitation at a constant speed, wherein an amount of oxygen in the gas is controlled in accordance with the amount of oxygen necessary for each step or phase of cultivation, which amount is determined by a known cultivation property with respect to the above microorganism.

7 Claims, 10 Drawing Figures 3,912,585

PROCESS FOR AEROBIC CULTIVATION OF MICROORGANISM

BACKGROUND OF THE INVENTION

1. Field of the Invention

The present invention relates to a process for aerobic cultivation of microorganism which assimilates n-paraffins, e.g. $C_7$ to $C_{20}$, and more particularly to a process for aerobic cultivation of the microorganism which enables the cultivation plant simplified and lowers the operating cost of the cultivation plant.

2. Description of the Prior Art

It goes without saying that aerobic cultivation of microorganisms such as yeasts, bacteria, etc. must be carried out under the condition of an oxygen-containing atmosphere such as in the presence of an air. In the case of microorganism which assimilates n-paraffins, a very large quantity of oxygen has to be supplied to the cultivating system because these hydrocarbons do not contain an oxygen atom in the molecule. Therefore the cultivation using n-paraffins needs about three times amount of oxygen in comparison of the case where organic carbon sources containing oxygen atoms, such as carbohydrates are used for a cultivation medium.

In order to provide the sufficient amount of oxygen to the cultivation system, it is a common practice to strongly agitate an aqueous medium in which microorganism and n-paraffins are dispersed. In a conventional cultivation of a batch system, the aerobic conditions such as an agitation speed, amount of oxygen to be supplied, etc. are kept constant, thereby maintaining the oxygen transfer rate (hereinafter abbreviated as O.T.R.) throughout the cultivation. It will be recognized that O.T.R. is dependent on the efficiency of the cultivating facilities, that is, O.T.R. is directly changed by the conditions for aeration and agitation of the cultivating medium or aqueous medium containing microorganism. In the batch system, the microorganism under consideration grows with an S-shaped curve and the amount of oxygen necessary for cultivation increases rapidly and non-linearly with an increase in an amount of microorganism in the aqueous medium. In the conventional cultivation, the aerobic conditions including especially O.T.R. have been determined by the maximum amount of oxygen consumed by the cultivation system so as to avoid a lack of oxygen throughout the cultivation. In the conventional process employing the constant aeration condition the amount of oxygen supplied to the system is about two times the amount that is actually needed for the microorganism during the cultivation. Therefore this process is uneconomical in view of the operating cost and operating efficiency.

SUMMARY OF THE INVENTION

One of the objects of the present invention is to provide a process for aerobic cultivation of microorganisms which assimilate n-paraffins. Another object of the present invention is to provide a process for aerobic cultivation of microorganisms which enables the use of simplified cultivating facilities and lowers the operating cost of the facilities.

Still another object is to provide a new process for aerobic cultivation of microorganism which can be performed within a shorter time for cultivation than the conventional cultivation method.

A further object of the present invention is to provide a process for aerobic cultivation of microorganism which produces microorganism with a higher protein content than that obtained by the conventional cultivation methods.

The present invention provides a process for aerobic cultivation of microorganism, i.e. yeasts and bacteria which assimilates n-paraffins having from 7 to 20 carbon atoms wherein an amount of oxygen to be supplied to an aqueous medium containing the microorganism and n-paraffins is controlled so that the amount of oxygen fulfills the required condition at every step of cultivation under agitation with a constant speed. Suitable yeasts include Torulopsis and Saachromyces and the bacteria include Corynebacterium and Pseudomonas. The above objects and other objects and features of the present invention will be apparent from the following detailed description taken in conjunction with the accompanying drawings, wherein:

DETAILED DESCRIPTION OF THE INVENTION

Figure 1:
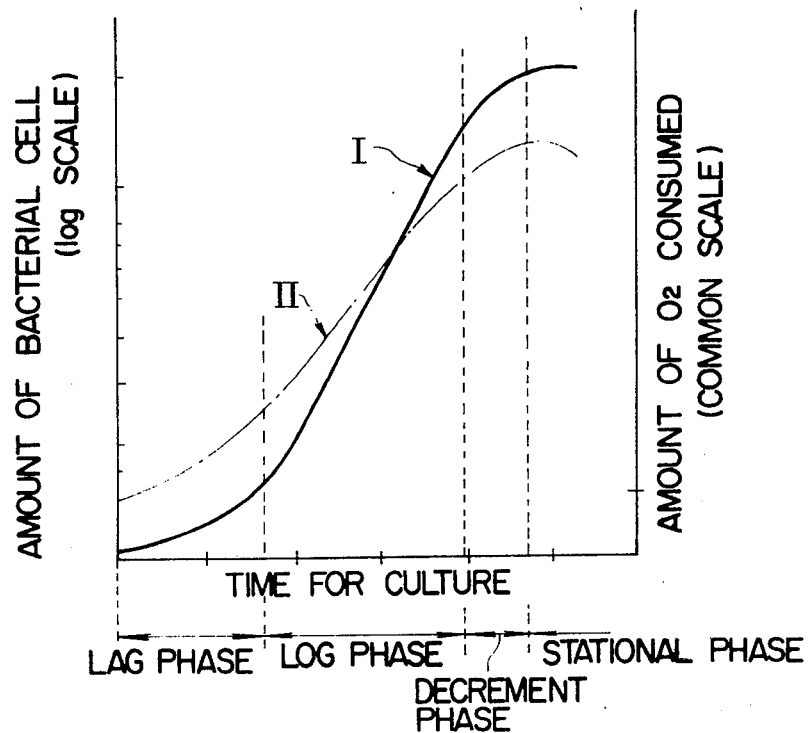
FIG. 1 is a graph showing a typical relationship between the time for cultivation and the amounts of microorganism and oxygen consumed.

It is well known, as shown in FIG. 1, that almost all kinds of microorganisms grow in accordance with an S-shaped curve I. Based upon the increase of cell concentration and the state of the microorganism, the process of growth can be subdivided, as shown in FIG. 1, into a lag phase, a log phase, a decrement phase and a stational phase. Consequently, the amount of oxygen necessary at each of the phases changes non-linearly with time as shown by curve II in the figure. As stated above, in the conventional methods, the amount of oxygen supplied is set up to the condition that requires the maximum amount of oxygen in the cultivation, that is, the amount of oxygen at the decrement phase and stational phase, as shown in FIG. 1, so as to avoid a shortage of oxygen throughout the whole cultivation period. However, this method is uneconomical since it always requires a supply of a large amount of oxygen.

The physico-chemical factor, which is directly changed by an aeration-agitation condition is the O.T.R. which represents the capability of the cultivating plant.

Figure 2:
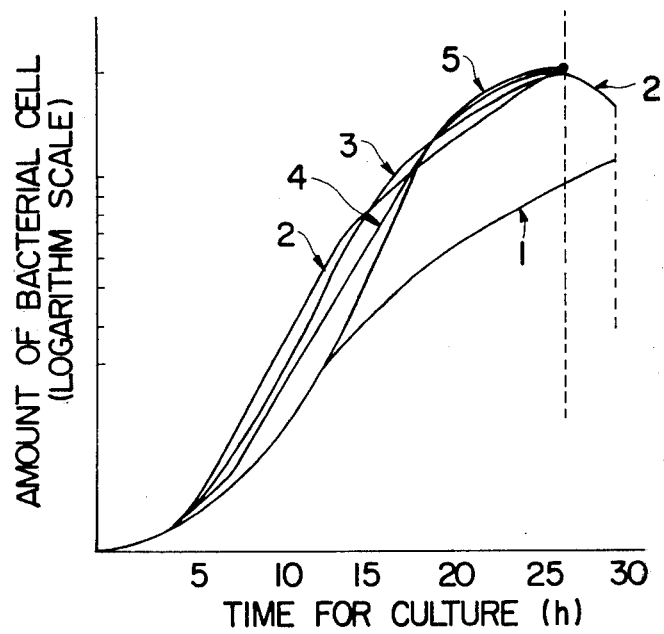
FIG. 2 is a graph showing curves for growth of the microorganism obtained by the processes with different oxygen supplying rates.

In FIG. 2 the relationship between a cell concentration and the time for cultivation is shown wherein cultivation is performed under the conditions of five kinds of O.T.R. The values for the oxygen transfer rate (O.T.R.) employed in the experiments conducted by the present inventors are as follows:

| | |
|---|---|
| 1st rate | 20 mmol/l./h. |
| 2nd rate | 50 mmol/l./h. |
| 3rd rate | 65 mmol/l./h. |
| 4th rate | 90 mmol/l./h. |
| 5th rate | 130 mmol/l./h. |

According to the above experiments, it has been found that the necessary cultivating time for each O.T.R. is substantially equal to one another, except for the first and second rates and that at the log phase the specific maximum growth rate ($\mu$ max) for the third to fifth rates are larger than those for the first and second rates. On the other hand, at the lag phase the larager the O.T.R., the longer the periods of the lag phase and log phase. From the above facts and from FIG. 2, it is understood that when the conditions for cultivation are kept constant throughout the whole cultivation, that is, the conditions of aeration and agitation are kept constant, the stronger the conditions, the more the growth rate.

Figure 3:
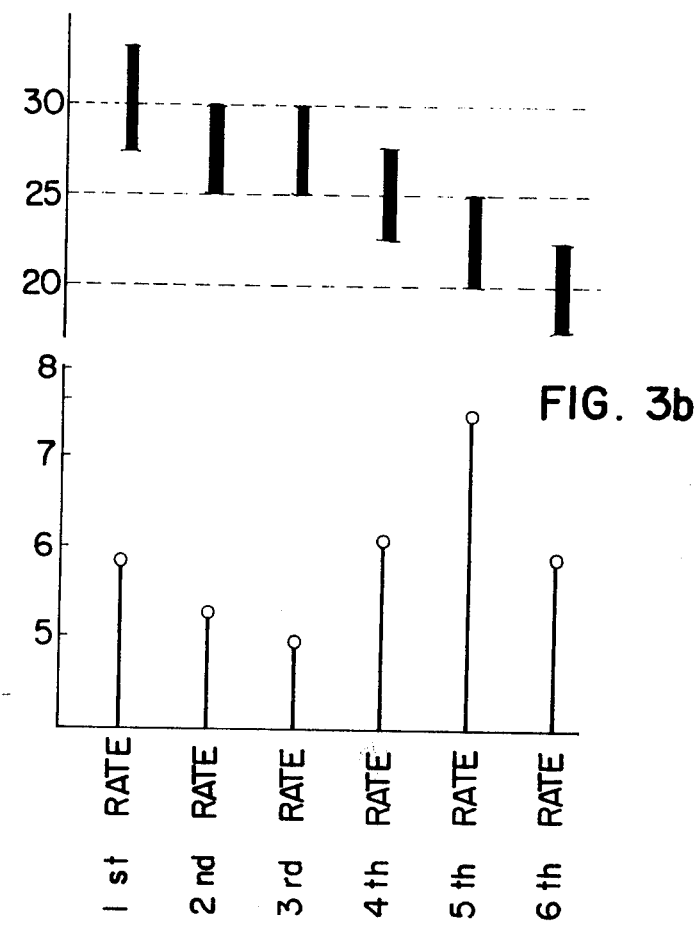
FIGS. 3a and 3b are graphs showing relationship between a particle size of liquid n-paraffins suspended in an aqueous medium and oxygen supplying rates.

The particle sizes of the n-paraffins dispersed in an aqueous medium at the beginning of the cultivation, i.e. at the lag phase, are measured and the average values thereof in lag phase are shown in FIG. 3. As apparent from FIG. 3, when the particle size is 25 to 30 microns, the third oxygen supplying rate is optimum for the lag phase because the period of lag phase becomes shortest under this condition. In other words, it is not always necessary for the cultivation at the beginning to make the O.T.R. large. Therefore, at the beginning, the oxygen supplying condition should be the second or third rate in order to make use of an average size of particle of liquid n-paraffins with about 30 microns, whereby the cultivation at the lag phase can be carried out efficiently without unduly increasing the amount of oxygen or increasing the power for operation. On the other hand, during and after the middle period of cultivation, the O.T.R. has to be increased to satisfy the amount of oxygen required with an increase in a cell concentration. By selecting the most suitable condition for supplying oxygen at every step of cultivation, the time of cultivation can be reduced even though the speed of agitation is kept constant.

In the experiments shown in FIGS. 3a and 3b, the conditions for aeration with respect to the first rate to the fifth rate are the same as those employed in the experiments shown in FIG. 2 and the condition for the sixth rate is 310 mmol./l./hour.

Figure 4:
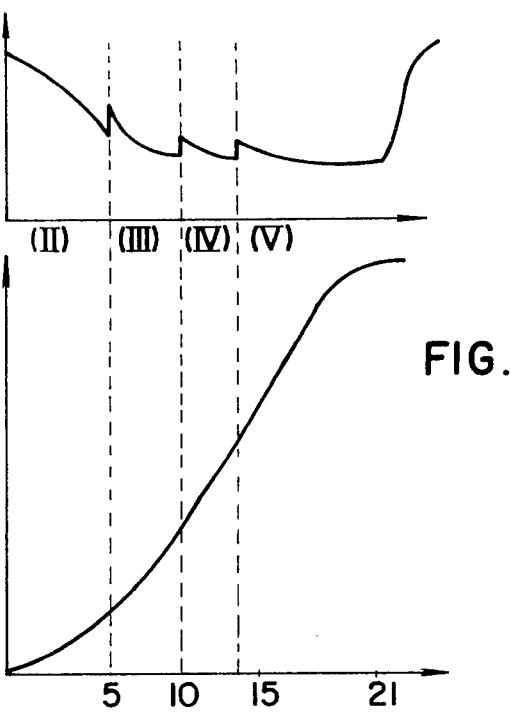
FIGS. 4a and 4b are graphs showing relationship between changes of dissolved oxygen concentration and cell concentration with respect to the cultivation time.

The inventors have made some experiments with respect to a new cultivation method of a stepwise oxygen supplying rate wherein the second rate of O.T.R. (50 mmol./l./h.) was used at the lag phase, the third rate (65 mmol./l./h.) at the first half of the log phase, the fourth rate (90 mmol./l./h.) at the latter half of the log phase and the fifth rate (130 mmol./l./h.) at the decrement phase and stational phase, respectively. The results of the above experiments are shown in FIGS. 4a and 4b. The amount of oxygen dissolved is gradually lowered with an increase in cell concentration (see FIG. 4a). The oxygen supplying rate was changed with the rate having an adequate O.T.R. value, at the time points of 5, 10 and 15 hours, so as to avoid the possibility that the amount of oxygen dissolved becomes less than the critical value at which the growth of microorganism is stopped because of a lack of oxygen. When the cultivation is finished, the dissolved oxygen content rapidly increases as shown in FIG. 4a. The cultivation according to the four step method of the present invention is finished within 21 hours, while in the conventional method shown in FIG. 1 requires for about 27 hours for completion. Therefore, the time for cultivation of the present invention is about 78 percent of conventional process.

Figure 5:
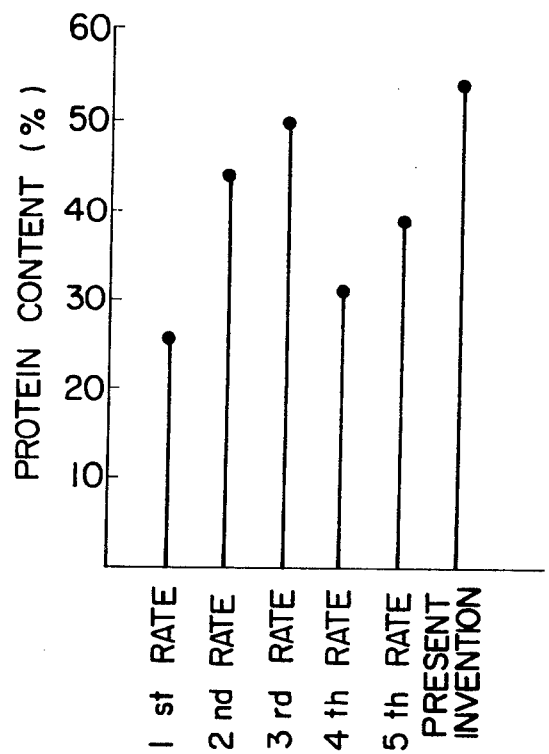
FIG. 5 is a graph showing a protein content of microorganism obtained by cultivation in accordance with different conditions for the oxygen supplying rate.

Further it is another advantage of the present invention that a protein content of the microorganism produced by the present invention is larger than that of the microorganism cultivated by any other methods wherein the oxygen supplying rate is kept constant throughout the cultivation. As shown in FIG. 5, the protein content of microorganism obtained by the present invention is the highest of all processes each employing the oxygen supplying rate of first, second, third, fourth or fifth rate. That is, the highest protein content in the conventional process is about 50 percent but according to the present invention the protein content is increased even though the same microorganism as in the conventional process is used. In the above experiments the conditions employed are as follows:

1. Yeast cell : *Candida albicans*
2. Cultural medium :
   a Main material ; 3 percent by volume of n-paraffins having carbon atoms of 7 to 20
   sub-materials ; 0.4 percent wt of potassium phosphate, 0.1 percent sodium phosphite, 2.8 percent of ammonium sulfate, 0.3 percent of corn steep liquor, and 0.1 percent of magnesium sulfate
3. Cultural temperature : 35°C.
4. pH : 6.0 (The pH value was kept at 6.0 by adding aqueous ammonia.)
5. Vessel volume of fermentor : 100 liters
6. Working volume (An amount of a liquid medium containing the above yeast cells, n-paraffins and cultural medium) : 70 liters The aeration and agitation conditions of the above experiments are as follows:

| Cell concentration (g/l) | Aeration ratio (VVM)* | Agitation speed (rpm) | O.T.R. (mmol./l./h.) |
|---|---|---|---|
| up to 2 | 0.5 | 300 | 50 (2nd rate) |
| 2–4 | 1.0 | 300 | 65 (3rd rate) |
| 4–9 | 1.0 | 340 | 90 (4th rate) |
| more than 9 | 1.5 | 360 | 130 (5th rate) |

*VVM represents the ratio of aeration for one minute to a unit quantity of a cultural medium, i.e. a volume of air m³/cultural medium m³/min.

Figure 6:
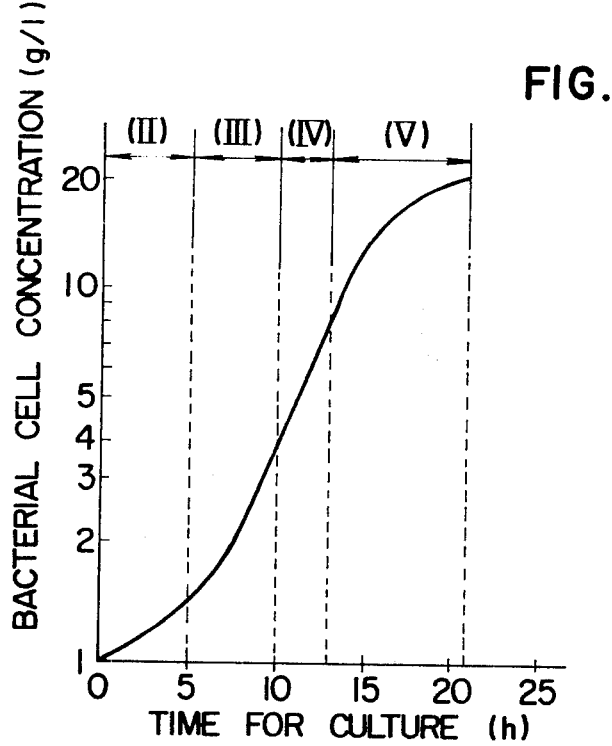
FIG. 6 is a graph showing relationship between a cell concentration and the time for cultivation.

The result of cultivation according to the above four-step aeration process with respect to one batch is shown in FIG. 6, wherein the lag phase was performed by the condition of the second rate, the first half of log phase by the condition of third rate, the latter half of the log phase by the fourth rate and the decrement and stational phases by the condition of fifth rate. As apparent from FIG. 6, the cultivation is finished within 21 hours according to the four-step process.

Though the present invention is applicable to aerobic cultivation using a single batch or fermentor, great advantages of the present invention are expected when the cultivation of the invention is performed in a plant which comprises a plurality of batches or fermentors. If the cultivation of four-step process described above is carried out in a single batch, there are disadvantages such that changing-over of the revolution number of the agitator is not easy an the cost of facilities for controlling the different conditions of operating the batch will increase. Also, such one batch system is not economical because mechanical loss of the plant especially in the agitating machine becomes large, so that the power of agitation is not saved so much even by the process of the present invention.

When the process of the present invention is applied to a practically usable cultivation plant which comprises a plurality of batches, the aeration or oxygen supplying rate to each of the batches is easily controlled by operating valves provided in a tubing communicating with each of the batches. Therefore, an increase in costs of facilities, operation, etc. can be avoided in such application.

Figure 7:
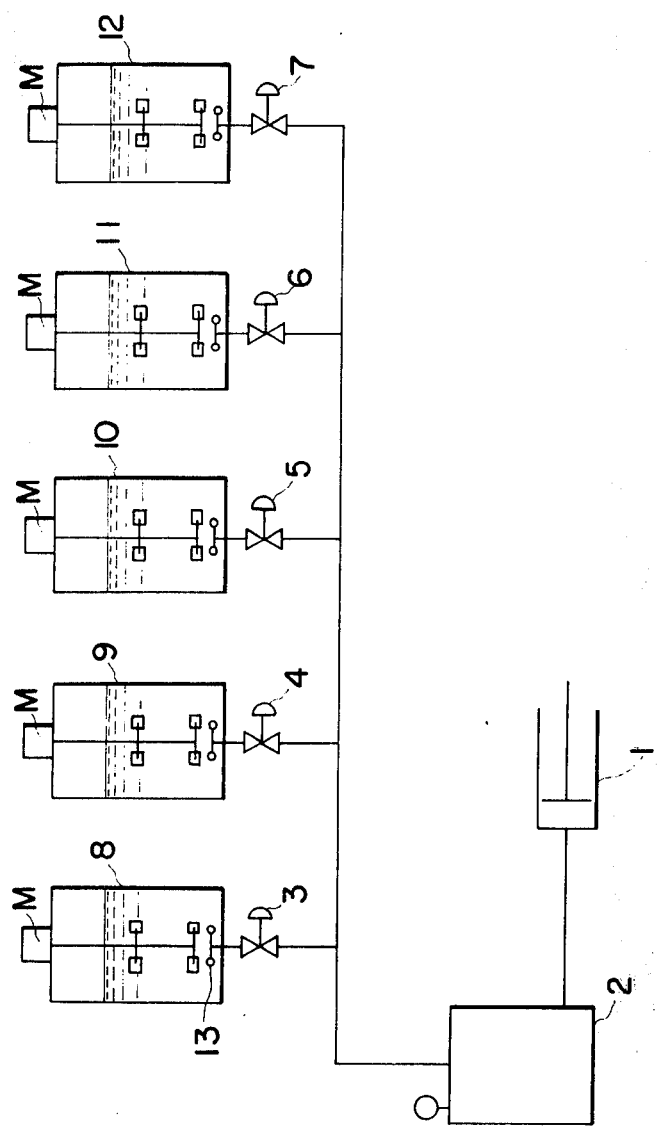
FIG. 7 is a sketch of the cultivation plant embodying the present invention.
Figure 8:
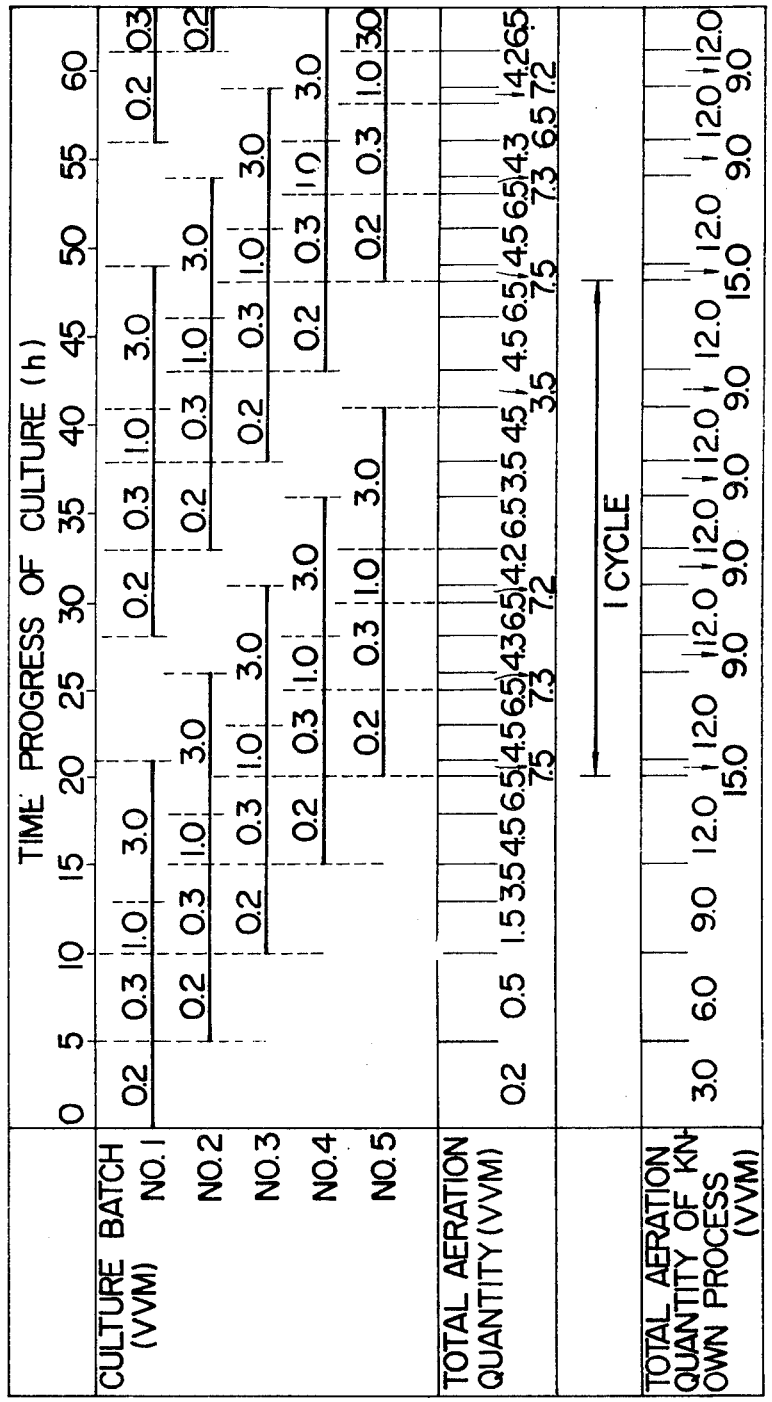
FIG. 8 is a time schedule for the operation of the plant shown in FIG. 7 and also for a conventional plant.

FIG. 7 is of a schematic drawing in which five batches 8 to 12 for fermentation are set in a plant, each of the batches being provided with an agitator operated at a constant speed throughout the cultivation and having a volume of about 300 cubic meters. The batches are all connected to a tubing communicating an air reservoir 2 to which air is provided by an air compressor 1. Each of the batches is provided with valve 3 to 7, whereby an amount of air to be supplied through sperger 13 to each of the batches is controlled by operating the valves 3 to 7 in accordance with a predetermined time schedule shown in FIG. 8, for instance. FIG. 8 shows an example of a time schedule for the cultivation plant shown in FIG. 7, in comparison with a time schedule of conventional process. The cultivation in each batch is completed after 21 hours, which cultivation time comprises 5 hours for a lag phase, 5 hours for the first half of log phase, 3 hours for the latter half of log phase and 8 hours for a decrement and stational phase, and the amounts of aeration of respective phases are 0.2 VVM, 0.3 VVM, 1.0 VVM and 3.0 VVM. The batches are separately and successively started with an interval of 5 hours and each of the batches is stopped for 7 hours after cultivation is completed, for preparation of the next cultivation.

In the conventional cultivation process wherein the amount of oxygen supplied is adjusted to the maximum necessary amount for the cultivation, the quantity of aeration is 3.0 VVM throughout the cultivation. When the time schedule in the conventional process is considered the same as that in the process of the present invention, an average quantity of aeration is 11.25 VVM × 60/h. five batches, as calculated from the values shown in the bottom of FIG. 8. And the maximum aeration in the conventional process is 15 VVM × 60/h. five batches. On the other hand, in the present invention, an average is only 5.27 VVM × 60/h. five batches and the maximum is 7.5 VVM × 60/h. five batches. Accordingly, the average quantity in the present invention is only 47 percent and the maximum is 50 percent, in comparison to those of the conventional process.

According to the present invention, it is possible to reduce greatly the expenses for equipment for driving the air compressor and for controlling the cultivation plant.

While the novel principles of the invention have been described, it will be understood that various omissions, modifications and changes in these principles may be made by one skilled in the art without departing from the spirit and scope of the invention.

What is claimed is:

1. A continuous process for the aerobic multi-batch cultivation of a microorganism which assimilates n-paraffins in a cultivating plant comprising a plurality of cultivating batches, each batch being provided with an agitator for agitating an aqueous suspension comprising the microorganism, n-paraffins having 7–20 carbon atoms and water charged thereto, and being connected through controllable valve means to a gas source for supplying an oxygen-containing gas to each of said batches, which comprises the steps of:
  establishing an S-shaped curve representing the relationship between a cultivation period required for performing the aerobic cultivation and the necessary amount of oxygen with respect to the microorganism;
  subdividing the cultivation period into a plurality of steps including a first cultivation step and a final cultivation step to thereby establish a time schedule for the start and finish of each step of cultivation among the batches;
  determining the necessary amount of oxygen at each of the steps in accordance with said S-shaped curve;
  supplying successively to each of said batches the oxygen-containing gas at a constant rate and in amount corresponding to the necessary amount of oxygen at each of the steps from said gas source, with agitation at a constant speed throughout the cultivation; and
  regulating successively the amount of gas to be supplied to each of the batches by controlling said valve means so as to increase stepwise the rate of gas supplied from the first step to the final step in accordance with the predetermined time schedule, after initiating the supply and regulation of the gas to a first batch, the supply and regulation of the gas being effected simultaneously to at least two of said batches during said process until termination thereof.

2. A process for aerobic cultivation according to claim 1, wherein the number of batches is more than four and the number of steps is four.

3. A process for aerobic cultivation of a microorganism according to claim 1, wherein the supply of gas in said amount at the first step to each of the batches is successively begun after the first step is finished in one of the batches.

4. A process for aerobic cultivation of a microorganism according to claim 1, wherein the S-shaped curve is divided into four phases, said phases successively comprising a lag phase, a log phase, a decrement phase and a stational phase; and said first step of cultivation is effected during the lag phase, the second step during the first half of the log phase, the third step during the latter half of the log phase and the decrement phase and the fourth step during the stational phase.

5. A continuous process for the aerobic multi-batch cultivation of a microorganism which assimilates n-paraffins in a cultivating plant including a plurality of cultivating batches each being provided with an agitator for agitation at a constant speed throughout the cultivation an aqueous suspension comprising the microorganism, n-paraffins containing from 7–20 carbon atoms and water charged therein and being connected through controllable valve means to a gas source for supplying an oxygen-containing gas to each of said batches, said process of operating each of said batches comprising the following steps:
1. supplying to one of the batches the oxygen-containing gas in an amount corresponding to the necessary amount of oxygen and at a constant rate during a first cultivation step;
2. changing the amount of gas supplied in an amount corresponding to the necessary amount of oxygen and at an increased constant rate during a second step, after the supply of gas during the first step has been completed;
3. further changing the amount of gas supplied in an amount corresponding to the necessary amount of oxygen and at an increased constant rate during a third step of cultivation, after the supply of gas during the second step has been completed; and
4. again changing the amount of gas supplied in an amount corresponding to the necessary amount of oxygen and at an increased constant rate during a fourth step of cultivation, after the supply of gas during the third step has been completed, thereby performing the whole cultivation in each of the batches, the cultivation time for performing the cultivation thereby being divided into the first, second, third, and fourth steps, said supply of gas to each of said batches and during each of said steps being determined by a time schedule set for determining the start and finish of growth of the microorganism during each of said steps, said oxygen-containing gas being successively supplied to each of the batches in accordance with said time schedule with the supply of gas being effected to at least two of said batches simultaneously after initiation of said process and prior to termination thereof.

6. A process for aerobic cultivation according to claim 5, wherein the time schedule is established to avoid lapping of the supply of the necessary amount of oxygen-containing gas over more than two batches whereby the capacity of the gas source can be minimized.

7. A process according to claim 6, wherein the time for cultivation with respect to each of said batches is divided into four steps and the period of cultivation is subdivided into four phases, the first step being conducted during a lag phase, the second step being conducted during the first half of a log phase, the third step being conducted during the latter half of the log phase, and the fourth step being conducted during a decrement phase and a stational phase of the cultivation respectively, with the amount of oxygen supplied being consumed at each of said steps of cultivation.

* * * * *